United States Patent
Holzleitner

(10) Patent No.: US 10,701,637 B2
(45) Date of Patent: Jun. 30, 2020

(54) TRANSCEIVER, TRANSMITTER, RECEIVER AND METHOD FOR DETERMINING A MINIMUM SUPPLY VOLTAGE FOR RECEIVERS AND TRANSMITTERS

(71) Applicant: Intel IP Corporation, Santa Clara, CA (US)

(72) Inventor: Josef Holzleitner, Wels (AT)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/078,667

(22) PCT Filed: Feb. 7, 2017

(86) PCT No.: PCT/IB2017/050648
§ 371 (c)(1),
(2) Date: Aug. 22, 2018

(87) PCT Pub. No.: WO2017/168264
PCT Pub. Date: Oct. 5, 2017

(65) Prior Publication Data
US 2019/0090196 A1    Mar. 21, 2019

(30) Foreign Application Priority Data
Mar. 31, 2016    (EP) .................... 16163260

(51) Int. Cl.
*H04W 52/02*    (2009.01)
*H04B 1/525*    (2015.01)
(Continued)

(52) U.S. Cl.
CPC ........ *H04W 52/0245* (2013.01); *H04B 1/525* (2013.01); *H04B 17/102* (2015.01);
(Continued)

(58) Field of Classification Search
CPC . H04W 52/0245; H04B 17/102; H04B 1/318; Y02D 70/00
See application file for complete search history.

(56) References Cited

U.S. PATENT DOCUMENTS 5,457,447 A * 10/1995 Ghaem ................. G01S 13/756
322/2 R
8,331,883 B2    12/2012 Sorensen
(Continued)

FOREIGN PATENT DOCUMENTS

WO    2011153077 A1    12/2011
WO    2014089520 A1    6/2014

*Primary Examiner* — Steven H Nguyen
(74) *Attorney, Agent, or Firm* — Kowert, Hood, Munyon, Rankin & Goetzel, P.C.

(57) ABSTRACT

A transceiver comprises a transmitter configured to generate a test signal and a receiver comprising a measurement circuit configured to receive the test signal from the transmitter and to determine a level of the test signal. A controller is configured to control a variable supply voltage generator to set a supply voltage for the transmitter to a predetermined value and to lower a supply voltage for the receiver until the level of the test signal within the receiver falls below a receiver threshold. A storage element is configured to store the supply voltage corresponding to the receiver threshold as the minimum supply voltage for the receiver.

20 Claims, 3 Drawing Sheets

(51) Int. Cl.
*H04B 17/10* (2015.01)
*H04B 17/318* (2015.01)

(52) U.S. Cl.
CPC ...... *H04B 17/318* (2015.01); *H04W 52/0225* (2013.01); *Y02D 70/1226* (2018.01); *Y02D 70/1262* (2018.01); *Y02D 70/1264* (2018.01); *Y02D 70/142* (2018.01); *Y02D 70/146* (2018.01); *Y02D 70/40* (2018.01)

(56) References Cited

U.S. PATENT DOCUMENTS

| | | | |
|---|---|---|---|
| 2004/0203477 A1 | 10/2004 | Carballo et al. | |
| 2006/0073857 A1* | 4/2006 | Hanabusa | G07B 15/063 455/572 |
| 2010/0208780 A1* | 8/2010 | Watanabe | H03F 3/245 375/219 |
| 2011/0156693 A1 | 6/2011 | Dobberpuhl et al. | |
| 2011/0306311 A1* | 12/2011 | Chang | H03L 1/00 455/86 |
| 2013/0157588 A1 | 6/2013 | Rofougaran | |
| 2015/0177326 A1* | 6/2015 | Chakraborty | G01R 31/31716 375/224 |
| 2016/0118805 A1* | 4/2016 | Swope | H02J 50/12 307/104 |
| 2016/0118834 A1* | 4/2016 | Swope | H02J 50/12 320/108 |
| 2016/0156310 A1* | 6/2016 | Pretl | H03L 7/07 331/60 |

\* cited by examiner

TRANSCEIVER, TRANSMITTER, RECEIVER AND METHOD FOR DETERMINING A MINIMUM SUPPLY VOLTAGE FOR RECEIVERS AND TRANSMITTERS

FIELD

Examples relate to transceivers, transmitters, receivers and to methods for determining a minimum supply voltage for receivers and transmitters.

BACKGROUND

Transceivers, for example for an application in long term evolution (LTE) systems comprise several components relating significantly to the current and power consumption of a device. However, Mobile telecommunication devices, for example, may require a low power consumption of the transceiver in order to increase a standby or operation time of the mobile telecommunications device. Therefore, there might be a desire to increase a power efficiency of transceivers.

BRIEF DESCRIPTION OF THE FIGURES

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

Figure 1:
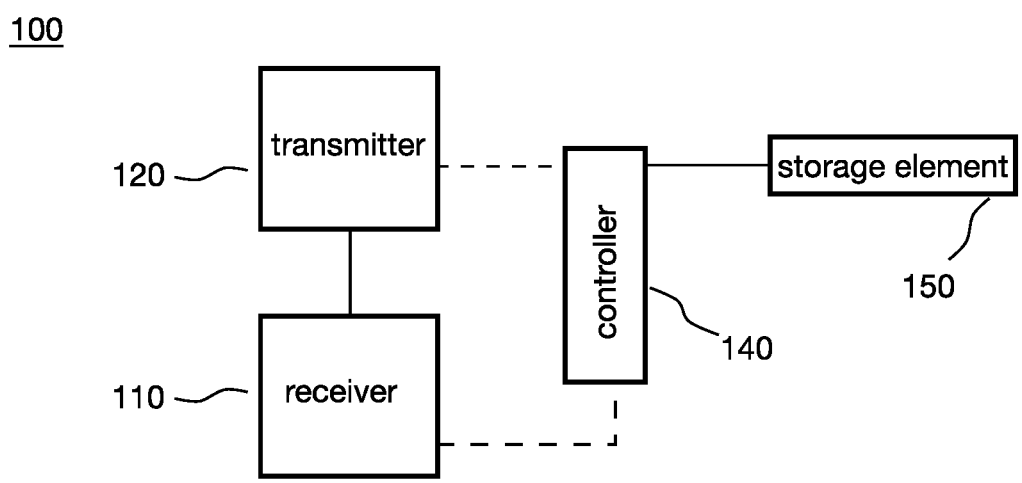
FIG. 1 illustrates an example of a transceiver.

FIG. 1 schematically illustrates an example of a transceiver 100. The transceiver 100 comprises a receiver 110 and a transmitter 120. Further, the transceiver 100 comprises a controller 140 which is configured to control a variable supply voltage generator used to provide a supply voltage to the receiver 110. The supply voltage generator is an optional feature of the transceiver 100 and not illustrated in FIG. 1. Examples of transceivers may also cooperate with an external supply voltage generator (power supply) not being part of the transceiver 100 itself. Further, the transceiver comprises a storage element 150. The controller 140 is configured to control a variable supply voltage generator to set a supply voltage for the transmitter 120 to a predetermined value and to adjust or lower a supply voltage for the receiver 110 until the level of the test signal within the receiver 110 falls below a receiver threshold. The storage element 150 is configured to store the supply voltage corresponding to the receiver threshold as the minimum supply voltage for the receiver 110.

Adjusting the supply voltage for the receiver 110 until the test signal within the receiver 110 is determined with a minimum acceptable level (the receiver threshold), allows determining a minimum supply voltage for the receiver 110 that can be used in the future to guarantee that the receiver 110 is operating in stable conditions. In particular, the minimum supply voltage is determined individually for the used hardware sample, which will generally result in lower minimum supply voltages as compared to the determination of the minimum supply voltage in conventional designs. Conventional designs define a minimum supply voltage by functionality limitations found in pre-silicon simulations. These, in turn, are mainly given by CMOS process variation and worst case modeling. Conventional transceiver samples will, therefore, use a minimum supply voltage for the receiver which is not the minimum achievable supply voltage for each real hardware sample, because this determination is made on a worst case assumption and for all future samples in common. That is, every parameter potentially leading to a higher required supply voltage is assumed to be maximally off its normal value. The conventional approach results in minimum supply voltages which are considerably higher even compared to a supply voltage required by a hypothetic transceiver where all parameters are nominal. Further, according to the examples described herein, other less predictable statistical deviations from the nominal design parameters are considered as well. For example, a reference voltage generator within the supply voltage generator (e.g. a bandgap voltage) may be used as a reference for the creation of the variable supply voltage. The generation of the reference voltage, therefore, is also prone to statistical deviations from its nominal design parameters.

With the examples described herein, the headroom of the conventional designs is no longer necessary, since the minimum supply voltage for the receiver is determined by a closed loop approach in each and every sample of a transceiver, determining a minimum acceptable supply voltage for a receiver for the individual sample. The process variation safety margin does not need to be considered and, therefore, the minimum supply voltage for the receiver can be determined, which, in turn, results in the minimally possible current consumption of the receiver. In particular, the generation of a local oscillator signal within a receiver or a transceiver and the distribution of the local oscillator signal to the individual receiver stages and to the generation of the IQ signal are one of the most significant contributors to the overall current consumption of a cellular transceiver. The determination of the minimum supply voltage for the receiver may, therefore, minimize the current consumption of the local oscillator circuit by removing the process variation supply voltage overhead. In summary, all possible statistical deviations from the nominal design parameters within each individual transceiver can be considered by the examples described herein to arrive at a minimum supply voltage for each individual sample.

Figure 2:
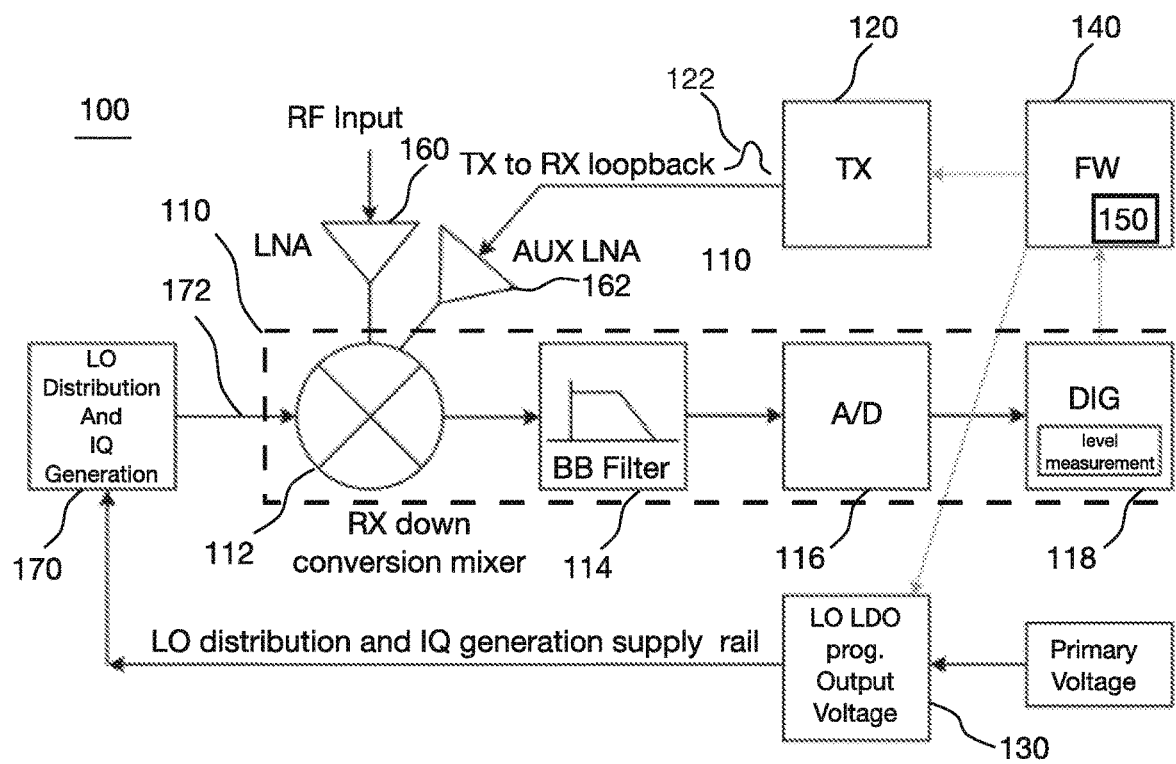
FIG. 2 illustrates an example of a transceiver in greater detail.

FIG. 2 illustrates an example of a transceiver 100. The transceiver comprises a receiver 110 and a transmitter 120. Further, the transceiver 100 comprises a controller 140 which is, amongst others, configured to control a variable supply voltage generator 130 used to provide a supply voltage to the receiver 110. The supply voltage generator 130 illustrated for the sake of clarity in FIG. 2 is an optional feature of the transceiver 100. The examples of transceivers may also cooperate with an external supply voltage generator (power supply) not being part of the transceiver 100 itself. For the sake of clarity, not all connections to components within the transceiver that may be powered by the supply voltage generator 130 are illustrated in FIG. 2.

Within the receiver, a mixer 112 is used to downmix a signal received from a radio frequency input 160 into the baseband. Within the baseband, an optional low pass filter 114 may be used to clean the spectrum of the baseband signal before it is digitized by an analog to digital converter 116 (ADC). The receiver of the example of FIG. 2 further comprises a measurement circuit 118 which is configured to determine a level of a signal, e.g. of a test signal, within the receiver. In the particular implementation of FIG. 2, the level of a signal component within the baseband signal is determined in the digital domain. Further embodiments, however, may also comprise a measurement circuit that is operating in an analog domain so as to determine a level of an analog signal component within the baseband signal. Further, a measurement circuit of further examples may also determine the level of the test signal in the radio frequency domain, that is, before being downmixed by means of the mixer 112.

The receiver 110 of the transceiver 100 further comprises a feedback input 162 which is configured to loop a transmit signal as generated by the transmitter 120 back into the receiver 110. The feedback input 162 can, for example, be used to determine an unwanted signal component or an unwanted spur within the signal received by the receiver 110. For example, in a frequency division duplex system (FDD) a part of the transmit signal generated by the transmitter 120 may leak into (couple into) the receiver 110 (the receive signal chain) and lead to a reference sensitivity degradation by reciprocal mixing due to, e.g., the clock signal phase noise. In general terms, the measurement circuit 118 in the digital baseband domain may be used to determine undesired signal components caused by the transmitter (TX) leakage within the baseband domain so as to allow to at least partly compensate the spur signal within the receive signal chain. For example, the measurement circuit 118 may be implemented as a single bin hardware FFT.

The transceiver of FIG. 2 further comprises an optional local oscillator circuit 170 which is configured to provide a local oscillation signal 172. The local oscillation signal 172 is, for example, distributed to the receiver 110 to be used within the mixer 112 of the receiver 110 to downmix a radio frequency signal into a baseband signal. Although not explicitly illustrated in FIG. 2, the local oscillation signal 172 may also be distributed to the transmitter 120 in order to enable the transmitter 120 to upmix a baseband signal to a radio frequency signal. According to further examples, the local oscillator circuit 170 provides local oscillation signals of different frequencies to the receiver 110 and to the transmitter 120, depending on the presently used transmitter configuration. A local oscillator circuit 170 may comprise a local oscillator to generate the local oscillation signal 172 as well as a distribution network to distribute the local oscillation signal 172 to mixers within the receiver chains and to mixers within the transmitter 120 for the generation of the I and Q signals in the radio frequency domain.

The transmitter 120 of the transceiver 100 of FIG. 2 is configured to generate a test signal 122 and to provide the test signal 122 to the receiver 110, for example by means of the feedback input 162 of the receiver 110. The measurement circuit 118 determines the level of the test signal 122 within the receiver 110. The controller 140 is configured to control the variable supply voltage 130 to set a supply voltage for the transmitter 120 to a predetermined value which is known to be sufficiently high to enable the transmitter 120 to operate without an error. Therefore, a test signal 122 can be provided without a degradation of the test signal 122. The controller 140 is configured to control the variable supply voltage 130 to lower a supply voltage for the receiver 110 until the level of the test signal as determined by means of the measurement circuit 118 within the receiver 110 falls below a receiver threshold. With this approach, a supply voltage that corresponds to the receiver threshold is determined. The so determined supply voltage is stored as a minimum supply voltage for the receiver 110. The transceiver 100 further comprises a storage element 150 to store the minimum supply voltage. While the example of FIG. 2 illustrates the storage element 150 as being part of the controller 140, further examples may also be implemented using a storage element as a separate circuit and not being embodied within the controller 140. The storage element itself may be any type of volatile or nonvolatile storage element, such as for example flash storage element, SDRAM, magnetic-storage element or the like. The controller 140 may be implemented using dedicated hardware or software or a combination of both. For example, hardware capable of executing software in association with appropriate software may be used. When provided by a processor, the functions of the controller 140 may be provided by a single dedicated processor, by a single shared processor, or by a plurality of individual processors, some of which or all of which may be shared. The term "processor" or "controller", however, shall not be limited to hardware exclusively capable of executing software, but may include digital signal processor (DSP) hardware, network processor, application specific integrated circuit (ASIC), field programmable gate array (FPGA), read only storage element (ROM) for storing software, random access storage element (RAM), and non-volatile storage. Other hardware, conventional and/or custom, may also be used.

Lowering the supply voltage for the receiver until the test signal within the receiver 110 is determined with a minimum acceptable level (the receiver threshold), allows determining a minimum supply voltage for the receiver that can be used in the future to guarantee that the receiver is still operating in stable conditions. In particular, the minimum supply voltage is determined individually for the used hardware sample, which will generally result in lower minimum supply voltages as compared to the determination of the minimum supply voltage in conventional designs. Conventional designs define a minimum supply voltage by functionality limitations found in pre-silicon simulations. These, in turn, are mainly given by CMOS process variation and worst case modeling. Further, other statistical deviations from the nominal design parameters are considered as well. For example, a reference voltage generator within the supply voltage generator (e.g. a bandgap voltage) may be used as a reference for the creation of the variable supply voltage. The generation of the reference voltage, therefore, is also prone to statistical deviations from its nominal design parameters. Conventional transceiver samples will, therefore, use a minimum supply voltage for the receiver which is not the minimum achievable supply voltage for each real hardware sample, because this determination is made on a worst case assumption and for all future samples in common. That is, every parameter potentially leading to a higher required supply voltage is assumed to be maximally off its normal value. The conventional approach results in minimum supply voltages which are considerably higher even compared to a supply voltage required by a hypothetic transceiver where all parameters are nominal.

With the examples described herein, this headroom is no longer necessary, since the minimum supply voltage for the receiver is determined by a closed loop approach in each and every sample of a transceiver, determining a minimum acceptable supply voltage for a receiver for the individual sample. The process variation safety margin does not need to be considered and, therefore, the minimum supply voltage for the receiver can be determined, which, in turn, results in the minimally possible current consumption of the receiver. In particular, the generation of the local oscillator signal 172 within a receiver or a transceiver and the distribution of the local oscillator signal 172 to the individual receiver stages and to the generation of the IQ signal are one of the most significant contributors to the overall current consumption of a cellular transceiver. The determination of the minimum supply voltage for the receiver may, therefore, minimize the current consumption of the local oscillator circuit 170 by removing the process variation supply voltage overhead. In summary, all possible statistical deviations from the nominal design parameters within each individual transceiver can be considered by the examples described herein to arrive at a minimum supply voltage for each individual sample.

According to some examples, the variable supply voltage as provided by the variable supply voltage generator 130 is used for the local oscillator circuit 170 so that a minimum acceptable supply voltage for the local oscillator circuit 170 can be determined that results in a receiver 110 still being able to determine the test signal 122.

According to further examples, the variable supply voltage provided by the supply voltage generator 130 is also used to power the digital to analog converter 116 (ADC) so that the determination of the minimum supply voltage for the receiver 110 also considers the supply voltage provided to the ADC 116.

According to the example illustrated in FIG. 2, the supply voltage for the receiver 110 can be determined for each and every transceiver sample in a closed loop approach. This determination may be performed at various instants or in various transceiver operation modes or stages.

According to some examples, the minimum supply voltage is determined after the production of the transceiver, for example, when the transceiver chip or die is completed in a semiconductor factory. According to further examples, the minimum supply voltage may be determined when the transceiver is already in use within, for example, a mobile telecommunications device. For example, when the mobile telecommunications device is switched on, a minimum supply voltage for the receiver may be determined. According to further examples, the determination of the minimum supply voltage may be performed every time a configuration of the transceiver is changed. To achieve this, the transceiver of some examples is configured to operate in a normal mode and in a test mode. In the test mode, the transmitter generates 120 the test signal 122 and the determination of the minimum supply voltage for the receiver 110 can be performed. In the normal mode, the transmitter 120 and the receiver 110 operate according to a presently used configuration to transmit and receive payload via a mobile communications network. The configuration may, for example, comprise the carrier frequencies used for the transmission and the reception of signals, that is, the local oscillator frequencies used to upmix and downmix the received and transmitted radio frequency signals in.

According to some embodiments, the transmitter may be configured to enter from normal mode into test mode when a configuration of the transceiver is changed and to return into normal mode after the minimum supply voltage for the receiver has been saved. This may serve to more precisely determine the minimum supply voltage, which may not only consider the process variation during the production of the transceiver but also the present temperature in which the transceiver is used. Further, entering into test mode every time the configuration of the transceiver is changed may account for a possible dependency of the minimum supply voltage on the frequency allocations of the transceiver. For example, the minimum supply voltage required for a first carrier frequency may be different than the minimum supply voltage required for a second, different carrier frequency.

While the previous considerations with respect to FIG. 2 have focused on the determination of a minimum supply voltage for a receiver, further examples may also determine a minimum supply voltage for a transmitter in a similar fashion. Before elaborating in more detail on the determination of a minimum supply voltage for a transmitter, the flowchart of FIG. 3 will be used to briefly summarize an example of a method for determining a minimum supply voltage for a receiver again.

Figure 3:
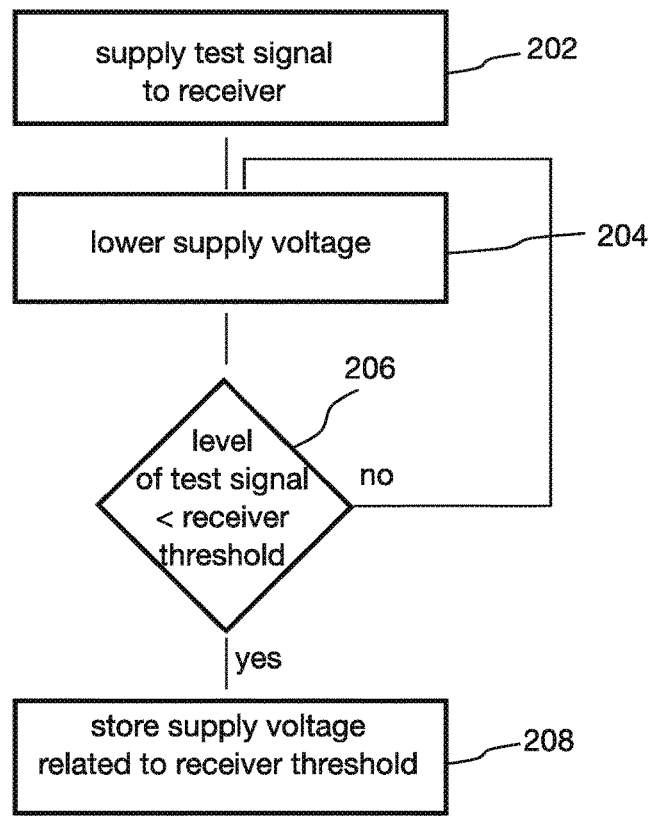
FIG. 3 illustrates a flowchart of an example of a method for determining a minimum supply voltage for a receiver.

In order to determine a minimum supply voltage for the receiver according to the method of FIG. 3, the supply voltage for the receiver is set to a start value in an initialization step 202. In a step of decreasing the supply voltage 204, the supply voltage is lowered. In a determination step 206, it is determined whether a level of a test signal within the receiver falls below a receiver threshold. If this is not the case, the supply voltage is lowered again. If, however, this is the case, the supply voltage corresponding to the receiver threshold is stored as the minimum supply voltage for the receiver in step 208. The control loop determined by steps 204 and 206 may be summarized as lowering the supply voltage until a level of a test signal within the receiver falls below a receiver threshold.

In order to perform the method illustrated in FIG. 3, it is of no major importance how the test signal itself is generated. According to an example as illustrated in FIG. 2, the test signal may be generated using the transmitter 120 of the transceiver itself. Further embodiments, however, may use external circuitry in order to provide an appropriate test signal. The minimum supply voltage for the receiver may correspond to the used receiver threshold in various ways. For example, if the supply voltage is decreased in finite steps, the last step where the test signal was still above the receiver threshold may be used as the minimum supply voltage. In other words, when the supply voltage is decreased in finite steps until the level of the test signal within the receiver falls below the receiver threshold due to a transition between a preceding step and a present step, the supply voltage of the preceding step may be saved as the minimum supply voltage for the receiver. According to further embodiments, other criteria in order to determine the correspondence between the receiver threshold and the minimum supply voltage may be used. For example, the supply voltage of the second to last step of the iterative approach illustrated in FIG. 3 may also be used as the minimum supply voltage.

Figure 4:
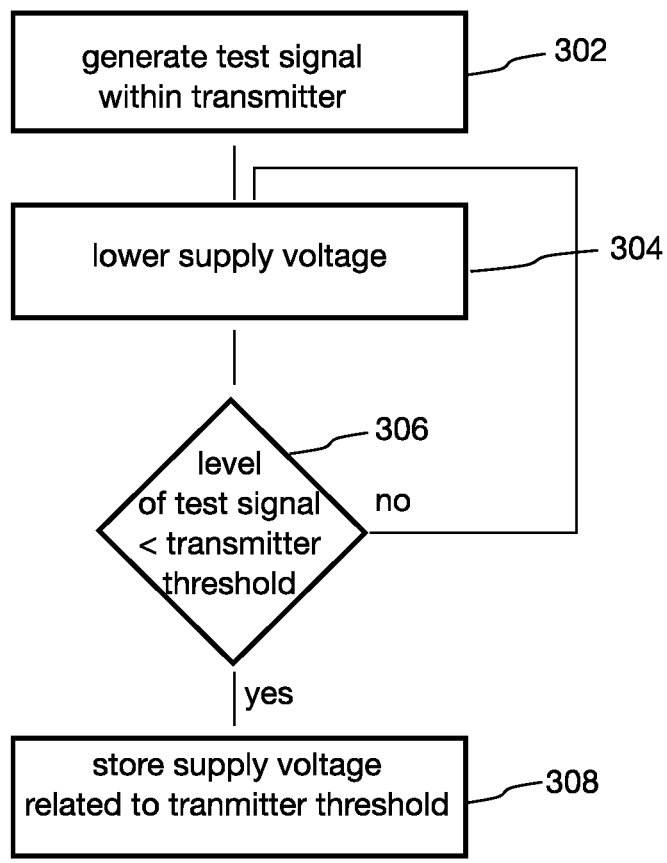
FIG. 4 illustrates a flowchart of an example of a method for determining a minimum supply voltage for a transmitter.

FIG. 4 illustrates an example as to high the supply voltage for the transmitter 120 of the transceiver 100 may be determined. Since the approach is similar to the determination of the minimum supply voltage for the receiver, the method is only briefly described with respect to the flowchart of FIG. 4.

The method for determining a minimum supply voltage for a transmitter comprises generating a test signal with the transmitter and supplying the test signal to a receiver in an initialization step 302. In a voltage decreasing step 304, the supply voltage of the transmitter is lowered. Then it is determined in step 306 whether a level of the test signal within the receiver falls below a transmitter threshold. If this is not the case, step 304 of lowering the supply voltage is again performed. If, however, this is the case, the supply voltage corresponding to the transmitter threshold is stored as the minimum supply voltage for the transmitter in a storing step 308.

While the minimum supply voltage for the receiver and for the transmitter may be determined independently from one another, some embodiments use the hardware within a transceiver to subsequently determine a minimum supply voltage for the receiver and a minimum supply voltage for the transmitter. In some examples, the minimum supply voltage for the receiver is determined first, while the subsequent determination of the minimum supply voltage for the transmitter uses the previously-determined minimum supply voltage for the receiver. That is, according to some examples, the receiver within a transceiver is set to use its previously determined minimum supply voltage before the supply voltage for the transmitter is lowered until the level of the test signal within the receiver falls below the transmitter threshold so as to determine the minimum supply voltage for the transmitter.

According to further examples, the determination of the minimum supply voltages may be performed starting with the determination of the minimum supply voltage for the transmitter. After the minimum supply voltage for the transmitter has been determined, the supply voltage for the transmitter is set to the minimum supply voltage before the generation of the test signal starts. With the minimum supply voltage of the transmitter being used, the supply voltage for the receiver is lowered until the level of the test signal within the receiver falls below the receiver threshold in order to determine the minimum supply voltage for the receiver.

Some of the previously described examples may be summarized in that a minimum LO power calibration principle uses the on-chip transmitter (GX) and the transmitter to receiver (RX) loop back to determine the minimum supply voltage for the local oscillator circuitry (LO chain) and for the IQ generation within the transmitter. To this end, some examples may use already existing building blocks within the transceiver in a closed loop approach. The transmitter may be used as a built-in signal generator to generate a test signal. The TX loop back to RX may be used to provide the test signal to each receiver within the transceiver. (In case multiple receiver chains are present, the test signal can be provided to each and every receiver within the transceiver).

Both the receiver and the transmitter may sequentially be the device under test (DUT). The measurement circuit which may be present as part of a digital spur canceller (single bin hardware FFT) within every receiver (receiver chain) may be used to measure the level of the test signal in the baseband domain. The digital spur canceller may therefore be used as a built-in signal level measurement device.

If, for example, the minimum supply voltage for the receiver is determined first, both the receiver and the transmitter may be set to use a predetermined supply voltage at the beginning. A test signal may be generated with a transmitter, fed back into the receiver and measured in the digital domain within the spur canceller in order to determine the level of the test signal. The supply voltage for the local oscillator circuit of the receiver is lowered until the level of the test signal falls below a predetermined threshold (i.e., the desired signal level disappears). This is the functional limit of the specific sample of the transceiver. Since the functional limit of the receiver's local oscillator part has been found, the minimum operating voltage for the transmitter may be determined. To this end, the minimum supply voltage for the receiver's local oscillator circuit may be restored to the last working setting, corresponding to the minimum supply voltage which can be used in a low performance mode of the receiver.

Subsequently, the same procedure can be repeated for the transmitter's local oscillator distribution path. To this end, the supply voltage for the transmitter's local oscillator circuit may be decreased until no desired signal level in the receiver can be measured, while the minimum supply voltage of the receiver is used. After the supply voltage for the transmitter's local oscillator circuit has been decreased until the test signal falls below the transmitter threshold, the last working setting, i.e. the last supply voltage level may be restored in order to set the minimum operating point for the transmitter.

According to the examples of transceivers described herein, the current consumption of a transceiver or its transmitter and receiver can be reduced to the functional minimum for each and every chip sample by searching the minimum supply voltage providing still functional circuits. To this end, the examples described herein can be used with lower power consumption than conventional transceivers where a minimum voltage found by simulation of process variations possibly occurring during the production of the transceiver are found. All nominal process corner samples will consume more power than what could theoretically be possible, and which will be found by the examples described herein.

Figure 5:
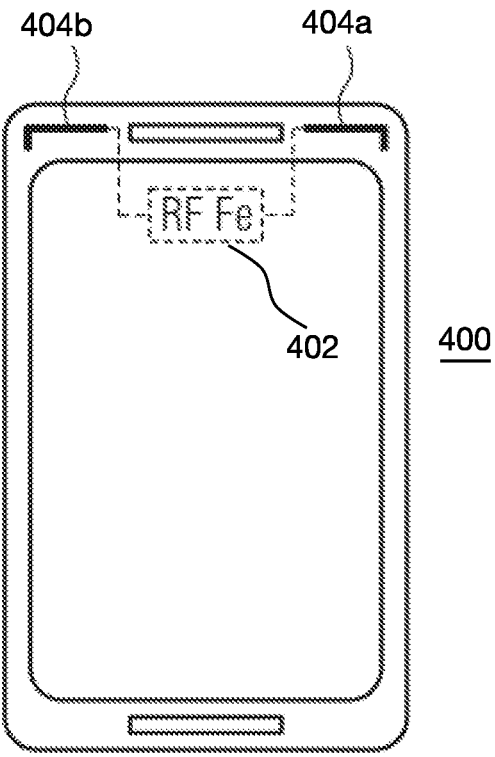
FIG. 5 schematically illustrates a mobile telecommunications device comprising a transmitter according to an example described herein.

FIG. 5 schematically illustrates a mobile telecommunications device 400 using a transceiver 402 in order to transmit and receive radio frequency signals by means of a first antenna 404a and a second antenna 404b. Of course, further implementations may use transceivers coupled to an arbitrary other number of antennas, for example to 4 antennas in 4×4 MIMO configuration.

To this end, the transceiver 402 is coupled to the first antenna 404a and to the second antenna 404b. Mobile telecommunication devices as disclosed in FIG. 5 using a transceiver 402 according to the examples described herein may operate according to every known and future telecommunication standard, such as for example: one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

A mobile telecommunications device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may, for example, correspond to a remote radio head, a transmission point or an access point. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

Example 1 is a transceiver, comprising a transmitter configured to generate a test signal; a receiver comprising a measurement circuit configured to receive the test signal from the transmitter and to determine a level of the test signal; a controller configured to control a variable supply voltage generator to set a supply voltage for the transmitter to a predetermined value and to adjust a supply voltage for the receiver until the level of the test signal within the receiver falls below a receiver threshold; and a storage element configured to store the supply voltage corresponding to the receiver threshold as the minimum supply voltage for the receiver.

In example 2, in the transceiver of example 1, the controller is further configured to control the variable supply voltage generator to set the supply voltage for the receiver to the minimum supply voltage for the receiver and to adjust a supply voltage for the transmitter until the level of the test signal within the receiver falls below a transmitter threshold; and the storage element is further configured to store the supply voltage corresponding to the transmitter threshold as the minimum supply voltage for the transmitter.

In example 3, in the transceiver of any of examples 1 or 2, the transmitter is configured to operate in a normal mode generating a payload signal and in a test mode generating the test signal.

In example 4, in the transceiver of example 3, the transmitter is configured to enter into test mode when a configuration of the transceiver is changed and to return into normal mode after the minimum supply voltage for the receiver has been saved.

In example 5, in the transceiver of example 4, the transmitter is configured to enter into test mode when a carrier frequency allocation of the transceiver is changed and to return into normal mode after the minimum supply voltage for the receiver has been saved.

In example 6, the transceiver of any of examples 1 to 5 optionally further comprises an Analog to Digital Converter in the receiver, the Analog to Digital Converter being configured to provide a digital representation of an analog baseband signal, wherein the variable supply voltage is used for the Digital to Analog Converter.

In example 7, the transceiver of any of examples 1 to 6 optionally further comprises a Digital to Analog Converter in the transmitter, the Digital to Analog Converter being configured to provide an analog representation of a digital baseband signal, wherein the variable supply voltage is used for the Digital to Analog Converter.

In example 8, the transceiver of any of examples 1 to 7 optionally further comprises a Local Oscillator circuit configured to provide at least one Local oscillator signal, wherein the variable supply voltage is used for the Local Oscillator circuit.

In example 9, the transceiver of any of examples 1 to 8 optionally further comprises a variable supply voltage generator configured to generate the variable supply voltage.

Example 10 is a transceiver, comprising a transmitter configured to generate a test signal; a receiver comprising a measurement circuit configured to receive the test signal from the transmitter and to determine a level of the test signal; a controller configured to control a variable supply voltage generator to set a supply voltage for the receiver to a predetermined value and to adjust a supply voltage for the transmitter until the level of the test signal within the receiver falls below a transmitter threshold; and a storage element configured to store the supply voltage corresponding to the transmitter threshold as the minimum supply voltage for the transmitter.

In example 11, the controller of the transceiver of example 10 is further configured to control the variable supply voltage generator to set the supply voltage for the transmitter to the minimum supply voltage for the transmitter and to adjust a supply voltage for the receiver until the level of the test signal within the receiver falls below a receiver threshold; and the storage element is further configured to store the supply voltage corresponding to the receiver threshold as the minimum supply voltage for the receiver.

In example 12, the transmitter of the transceiver of any of examples 10 or 11 is configured to operate in a normal mode generating a payload signal and in a test mode generating the test signal.

In example 13, the transmitter of the transceiver of example 12 is configured to enter into test mode when a configuration of the transceiver is changed and to return into normal mode after the minimum supply voltage for the transmitter has been saved.

In example 14, the transmitter of the transceiver of example 13 is configured to enter into test mode when a carrier frequency allocation of the transceiver is changed and to return into normal mode after the minimum supply voltage for the transmitter has been saved.

In example 15, the transceiver of any of examples 10 to 14, optionally further comprises a Digital to Analog Converter in the transmitter, the Digital to Analog Converter being configured to provide an analog representation of a digital baseband signal, wherein the variable supply voltage is used for the Digital to Analog Converter.

In example 16, the transceiver of any of examples 10 to 15, optionally further comprises an Analog to Digital Converter in the receiver, the Analog to Digital Converter being configured to provide a digital representation of an analog baseband signal, wherein the variable supply voltage is used for the Digital to Analog Converter.

In example 17, the transceiver of any of examples 10 to 16, optionally further comprises a Local Oscillator circuit configured to provide at least one Local oscillator signal, wherein the variable supply voltage is used for the Local Oscillator.

In example 18, the transceiver of any of examples 10 to 17, optionally further comprises a variable supply voltage generator configured to generate the variable supply voltage.

Example 19 is a method for determining a minimum supply voltage for a receiver, comprising setting the supply voltage of the receiver to a start value; supplying a test signal to the receiver; lowering the supply voltage until a level of a test signal within the receiver falls below a receiver threshold; and storing the supply voltage corresponding to the receiver threshold as the minimum supply voltage for the receiver.

In example 20, in the method of example 19, lowering the supply voltage comprises decreasing the supply voltage in finite steps until the level of the test signal within the receiver falls below the receiver threshold due to a transition between a preceding step and a present step; and storing the supply voltage of the preceding step as the minimum supply voltage for the receiver.

Example 21 is a method for determining a minimum supply voltage for a transmitter, comprising setting the supply voltage of the transmitter to a start value; generating a test signal with the transmitter and supplying the test signal to a receiver; lowering the supply voltage of the transmitter until a level of the test signal within a receiver falls below a threshold; and storing the supply voltage corresponding to the transmitter threshold as the minimum supply voltage for the transmitter.

In example 22, in the method of example 21, lowering the supply voltage comprises decreasing the supply voltage in finite steps until the level of the test signal within the receiver falls below the transmitter threshold due to a transition between a preceding step and a present step; and storing the supply voltage of the preceding step as the minimum supply voltage for the transmitter.

Example 23 is a receiver circuit, comprising a receiver comprising a measurement circuit configured to determine a level of a test signal within the receiver; a controller configured to control a variable supply voltage generator to lower a supply voltage for the receiver until the level of the test signal within the receiver falls below a receiver threshold; and a storage element configured to store the supply voltage corresponding to the receiver threshold as a minimum supply voltage for the receiver.

In example 24, the receiver of the receiver circuit of example 23 is configured to operate in a normal mode receiving a payload signal and in a test mode receiving the test signal.

In example 25, the receiver circuit of example 24 is configured to enter into test mode when a configuration of the receiver is changed and to return into normal mode after the minimum supply voltage for the receiver has been saved.

In example 26, the receiver of the receiver circuit of example 25 is configured to enter into test mode when a carrier frequency allocation of the receiver is changed and to return into normal mode after the minimum supply voltage for the receiver has been saved.

Example 27 is a transmitter circuit, comprising a transmitter configured to provide a test signal; a measurement circuit configured to determine a level of a test signal generated by the transmitter; a controller configured to control a variable supply voltage generator to lower a supply voltage for the transmitter until the level of the test signal falls below a transmitter threshold; and a storage element configured to store the supply voltage corresponding to the transmitter threshold as a minimum supply voltage for the transmitter.

In example 28, the transmitter of the transmitter circuit of example 27 is configured to operate in a normal mode generating a payload signal and in a test mode generating the test signal.

In example 29, the transmitter of the transmitter circuit of example 28 is configured to enter into test mode when a configuration of the transmitter is changed and to return into normal mode after the minimum supply voltage for the transmitter has been saved.

In example 30, the transmitter of the transmitter circuit of example 29 is configured to enter into test mode when a carrier frequency allocation of the transmitter is changed and to return into normal mode after the minimum supply voltage for the transmitter has been saved.

Example 31 is a mobile telecommunications device comprising a transceiver according to any of examples 1 to 18.

The aspects and features mentioned and described together with one or more of the previously detailed examples and figures, may as well be combined with one or more of the other examples in order to replace a like feature of the other example or in order to additionally introduce the feature to the other example.

Examples may further comprise a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What claimed is:

1. A transceiver, comprising:
    a transmitter configured to generate a test signal;
    a receiver comprising a measurement circuit configured to receive the test signal from the transmitter and to determine a level of the test signal;
    a controller configured to control a variable supply voltage generator to set a supply voltage for the transmitter to a predetermined value and to adjust a supply voltage for the receiver until the level of the test signal within the receiver falls below a receiver threshold; and
    a storage element configured to store the supply voltage corresponding to the receiver threshold as the minimum supply voltage for the receiver.

2. The transceiver of claim 1, wherein the controller is further configured to control the variable supply voltage generator to set the supply voltage for the receiver to the minimum supply voltage for the receiver and to adjust a supply voltage for the transmitter until the level of the test signal within the receiver falls below a transmitter threshold; and
    wherein the storage element is further configured to store the supply voltage corresponding to the transmitter threshold as the minimum supply voltage for the transmitter.

3. The transceiver of any of claim 1, wherein the transmitter is configured to operate in a normal mode generating a payload signal and in a test mode generating the test signal.

4. The transceiver of claim 1, wherein the transmitter is configured to enter into test mode when a configuration of the transceiver is changed and to return into normal mode after the minimum supply voltage for the receiver has been saved.

5. The transceiver of claim 1, wherein the transmitter is configured to enter into test mode when a carrier frequency allocation of the transceiver is changed and to return into normal mode after the minimum supply voltage for the receiver has been saved.

6. The transceiver of claim 1, further comprising an Analog to Digital Converter in the receiver, the Analog to Digital Converter being configured to provide a digital representation of an analog baseband signal, wherein the supply voltage is used for the Analog to Digital Converter.

7. The transceiver of claim 1, further comprising a Digital to Analog Converter in the transmitter, the Digital to Analog Converter being configured to provide an analog representation of a digital baseband signal, wherein the supply voltage is used for the Digital to Analog Converter.

8. The transceiver of claim 1, further comprising a Local Oscillator circuit configured to provide at least one Local oscillator signal, wherein the supply voltage is used for the Local Oscillator circuit.

9. The transceiver of claim 1, further comprising a variable supply voltage generator configured to generate the variable supply voltage.

10. A transceiver, comprising:
    a transmitter configured to generate a test signal;
    a receiver comprising a measurement circuit configured to receive the test signal from the transmitter and to determine a level of the test signal;
    a controller configured to control a variable supply voltage generator to set a supply voltage for the receiver to a predetermined value and to adjust a supply voltage for the transmitter until the level of the test signal within the receiver falls below a transmitter threshold; and
    a storage element configured to store the supply voltage corresponding to the transmitter threshold as the minimum supply voltage for the transmitter.

11. The transceiver of claim 10, wherein the controller is further configured to control the variable supply voltage generator to set the supply voltage for the transmitter to the minimum supply voltage for the transmitter and to adjust a supply voltage for the receiver until the level of the test signal within the receiver falls below a receiver threshold; and
    wherein the storage element is further configured to store the supply voltage corresponding to the receiver threshold as the minimum supply voltage for the receiver.

12. The transceiver of claim 10, wherein the transmitter is configured to operate in a normal mode generating a payload signal and in a test mode generating the test signal.

13. The transceiver of claim 10, wherein the transmitter is configured to enter into test mode when a configuration of the transceiver is changed and to return into normal mode after the minimum supply voltage for the transmitter has been saved.

14. The transceiver of claim 10, wherein the transmitter is configured to enter into test mode when a carrier frequency allocation of the transceiver is changed and to return into normal mode after the minimum supply voltage for the transmitter has been saved.

15. The transceiver of claim 10, further comprising a Digital to Analog Converter in the transmitter, the Digital to Analog Converter being configured to provide an analog representation of a digital baseband signal, wherein the supply voltage is used for the Digital to Analog Converter.

16. The transceiver of claim 10, further comprising an Analog to Digital Converter in the receiver, the Analog to Digital Converter being configured to provide a digital representation of an analog baseband signal, wherein the supply voltage is used for the Analog to Digital Converter.

17. The transceiver of claim 10, further comprising a Local Oscillator circuit configured to provide at least one Local oscillator signal, wherein the supply voltage is used for the Local Oscillator.

18. The transceiver of claim 10, further comprising a variable supply voltage generator configured to generate the variable supply voltage.

19. A method for determining a minimum supply voltage for a receiver, comprising:
    setting the supply voltage of the receiver to a start value;
    supplying a test signal to the receiver;
    lowering the supply voltage until a level of a test signal within the receiver falls below a receiver threshold; and
    storing the supply voltage corresponding to the receiver threshold as the minimum supply voltage for the receiver.

20. The method of claim 19, wherein lowering the supply voltage comprises:
    decreasing the supply voltage in finite steps until the level of the test signal within the receiver falls below the receiver threshold due to a transition between a preceding step and a present step; and
    storing the supply voltage of the preceding step as the minimum supply voltage for the receiver.

\* \* \* \* \*